United States Patent [19]

Dombchik

[11] 3,986,827
[45] Oct. 19, 1976

[54] STORAGE-STABLE CONCENTRATED AQUEOUS SOLUTION OF DISAZO ACID DYE

[75] Inventor: Steven Arnold Dombchik, Wilmington, Del.

[73] Assignee: E. I. Du Pont de Nemours and Company, Wilmington, Del.

[22] Filed: May 20, 1974

[21] Appl. No.: 471,812

Related U.S. Application Data

[63] Continuation-in-part of Ser. No. 284,478, Aug. 29, 1972, abandoned.

[52] U.S. Cl. .................................. 8/41 B; 8/41 R; 8/85 B; 260/186
[51] Int. Cl.² .................... D06P 1/39; D06P 1/649
[58] Field of Search .............. 8/41 R, 41 A, 41 B, 8/41 C, 41 D, 85, 82, 172; 260/186

[56] References Cited
UNITED STATES PATENTS

| | | |
|---|---|---|
| 2,989,360 | 6/1961 | Mautner .................................. 8/55 |
| 3,281,201 | 10/1966 | Mautner ............................... 8/93 X |
| 3,600,376 | 8/1971 | Franklin ............................. 260/175 |
| 3,681,320 | 8/1972 | Franklin ............................. 260/175 |

FOREIGN PATENTS OR APPLICATIONS 631,379  8/1963  Belgium

*Primary Examiner*—Christopher A. Henderson, Jr.

[57] ABSTRACT

Storage-stable, concentrated, aqueous, disazo acid dye solution consisting essentially of 10–25 weight % of the lithium or tri(2-hydroxyethyl)ammonium salt of

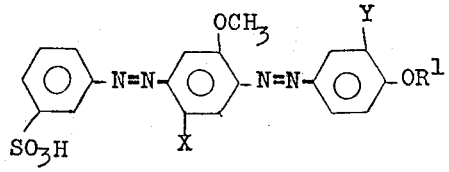

wherein one of X and Y is H and the other is $CH_3$ and $R^1$ is $CH_2CH_2OH$, $CH_2CH(CH_3)OH$ or $CH_2CH(C_2H_5)OH$, 5–25 weight % of N-methyl-2-pyrrolidone and the balance, to 100%, water.

5 Claims, No Drawings

STORAGE-STABLE CONCENTRATED AQUEOUS SOLUTION OF DISAZO ACID DYE

CROSS-REFERENCE TO RELATED APPLICATION

This is a continuation-in-part of copending application Ser. No. 284,478 filed Aug. 29, 1972 and now abandoned.

BACKGROUND OF THE INVENTION

1. Field of the Invention

This invention relates to storage-stable, concentrated aqueous solutions of disazo acid dyes.

2. Description of the Prior Art

The use of direct, acid and basic dyes as concentrated aqueous solutions, often referred to in the art as liquid dyes, has become commercially important relatively recently for dyeing paper and textile goods. The chief advantages of such liquid dyes over dye powders are the avoidance of dusting problems in handling and the great ease and rapidity of metering of the liquid dyes. Ideally, a liquid dye consists of an aqueous solution of the dye, thus avoiding disposal or recycling problems associated with solutions containing organic solvents. Dyes containing at least two ionizable groups, for example, sulfonic acid or quaternary ammonium groups, often have sufficient water solubility to give aqueous solutions of the desired concentration for use as liquid dyes, that is, at least 10 weight %. In some cases, the requisite solubility of polysulfonated dyes can be obtained by judicious choice of the cation associated therewith. For example, U.S. Pat. No. 3,600,376 discloses aqueous liquid dyes containing 10–20 weight % of the lithium salts of various tetrasulfonated disazo dyes. U.S. Pat. No. 3,681,320 discloses aqueous solutions of the triethanolamine salts of such dyes. It is much more common in the art, however, to prepare liquid dyes which consist in part, or even predominantly, of a solubilizing aid which is usually a water miscible organic liquid. British Pat. No. 1,202,798 discloses aqueous preparations of the sodium salts of polysulfonated azo dyes to which an acid amide, preferably urea, has been added. U.S. Pat. No. 3,551,088 discloses aqueous solutions of tri- and tetrasulfonated disazo dyes containing 20–30 weight % of dye and 10–25 weight % of dimethyl sulfoxide, the latter being used as a solubilizing aid. U.S. Pat. No. 3,346,322 discloses concentrated organic or aqueous organic solutions of water soluble aliphatic carboxylic acid salts of basic dyes, the organic liquid being selected from glycols and ethers thereof, amides, butyrolactone, acetonitrile, tetrahydrofuran, dioxane, dimethylsulfoxide and N-methylpyrrolidone.

In contrast to the above, the sodium salts of monosulfonated disazo dyes generally have limited solubility in cold water; they are seldom more than 1 weight % soluble and often their solubilities may be as low as a few hundreths of 1%. Although the solubilities of some monosulfonated dyes can be markedly improved by employing lithium, ammonium or triethanolammonium as the cation associated therewith, the solubilities realized are not sufficient to produce a concentrated, stable aqueous solution of commercial acceptability.

SUMMARY OF THE INVENTION

It is an object of this invention to provide a storage-stable, concentrated aqueous solution of a monosulfonated disazo dye. In summary, the present invention resides in a storage-stable, concentrated, aqueous, disazo acid dye solution consisting essentially of, on a weight basis, a. 10–25% of the lithium or tri(2-hydroxyethyl)-ammonium salt of the dye having the formula

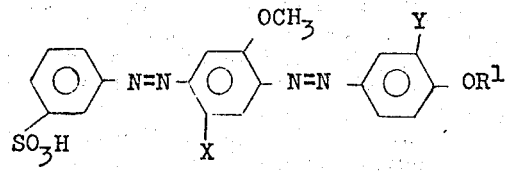

wherein one of X and Y is H and the other is $CH_3$ and $R^1$ is $CH_2CH_2OH$, $CH_2CH(CH_3)OH$ or $CH_2CH(C_2H_5)OH$;

b. 5–25% of N-methyl-2-pyrrolidone; and c. the balance, to 100%, water.

DETAILED DESCRIPTION OF THE INVENTION

The dye employed in the aqueous solution (liquid dye) of this invention is readily preparable employing known diazotization and coupling techniques. The dye can be prepared by diazotizing metanilic acid, coupling the diazonium salt under acidic conditions to o-anisidine or cresidine to produce a monoazo compound which is diazotized and coupled to phenol or o-cresol to produce a disazo compound which is reacted, under alkaline conditions, with ethylene-, propylene- or butylene oxide. The dye can be produced as either the lithium or the tri(2-hydroxyethyl)ammonium salt, or a mixture of the two, employing conventional procedures. Lithium is the preferred cation since, if present during the final coupling, it provides lower reaction mass viscosities and coupling is facilitated; if present during hydroxyalkylation, it provides a higher pH (about 9–10) and hydroxyalkylation is facilitated.

The liquid dye of this invention contains at least about 10 weight % of dye (active ingredient), at least about 5 weight % of N-methyl-2-pyrrolidone (NMP) and at least about 50 weight % of water. Although there is no functional upper limit on the amount of NMP that can be used, a commercially useful liquid dye can be produced by employing NMP in amounts which constitute up to 25 weight % of the liquid dye. Greater amounts of NMP add to the cost of the liquid dye and to the problems of eliminating or recycling the NMP. The liquid dye is best obtained by preparing the dye in aqueous NMP. Alternatively, the dye can be prepared in an aqueous medium and the desired amount of NMP can be added after dye formation is complete. As a further alternative, although not often done, the dye can be prepared and isolated and then dissolved in aqueous NMP.

The liquid dye of this invention has excellent storage stability, suffering no strength loss on prolonged storage for several months and undergoing no dye precipitation after 6 months of storage at 0° C. It is particularly useful for coloring nylon and it can be used in any of the batch or continuous dyeing or printing procedures presently known and used in the trade. A significant feature of this invention is that the storage-stable, concentrated, aqueous dye solution consists essentially of only three materials, namely, the above-defined dye, NMP and water. Excluded from the invention, therefore, is a dye solution which contains a known solubilizing agent, such as an aliphatic acid, as an essential material.

In the following examples parts are given by weight.

EXAMPLE 1

A stirred slurry of 130 parts of 3-methoxy-4-aminoazobenzene-3'-sodium sulfonate, 400 parts of water and 112 parts of 10N-hydrochloric acid was treated slowly with 122 parts of 5N-sodium nitrite. After stirring for one hour, the diazonium salt was isolated by filtration and washed with water. The wet cake was slurried in 200 parts of water and then added slowly to a stirred mixture of 48 parts of o-cresol, 59.6 parts of triethanolamine and 200 parts of water at 25° C. The resulting aqueous mixture was treated with 6 parts of triethanolamine and 67 parts of propylene oxide and then heated to the reflux temperature for 10 hours. When the reaction was complete, 80 parts of NMP were added and the solution was clarified by filtration. The total weight of the solution was 800 parts; the amount of NMP was 10 weight %. Dye concentration was determined spectrally to be 21.3 weight %, the dye being the triethanolammonium salt of the dye of the formula given above wherein $R^1$ is $CH_2CH(CH_3)OH$, X is H and Y is $CH_3$.

When the above procedure was repeated in the absence of NMP and in the presence of enough water to produce a 15% solution of the triethanolamine salt of the dye, precipitation occurred within 2 days.

EXAMPLE 2

Example 1 was repeated except that the triethanolamine was replaced with 16.8 parts of lithium hydroxide monohydrate, thus giving the lithium salt of the dye of the formula given above wherein $R^1$ is $CH_2CH(CH_3)OH$, X is H and Y is $CH_3$. The resulting dye solution contained 10 weight % NMP and 20 weight % dye.

EXAMPLE 3

3-Methoxy--aminoazobenzene-3'-aminoazobenzene-3'-sodium sulfonate (165 parts) was diazotized with sodium nitrite in dilute hydrochloric acid in conventional fashion and the diazo compound was isolated by filtration and washed with water. The diazo wet cake was then added in portions to a solution of 58 parts of o-cresol and 21 parts of lithium hydroxide monohydrate in 600 parts of water at 25° C. The resulting mixture was heated in an autoclave for 12 hours at 90° C. with 2 parts of lithium hydroxide monohydrate and 88 parts of ethylene oxide. Finally, 400 parts of NMP and 250 parts of water were added to give a dye solution containing 25 weight % NMP and 12.3 weight % dye (based on an absorptivity for the pure dye of 66 liters/gram/cm. at 404 mμ), the dye being the lithium salt of the dye of the formula given above wherein $R^1$ is $CH_2CH_2OH$, X is H and Y is $CH_3$.

In contrast, the sodium salt of the dye of this example required about 90 weight % NMP to produce a solution of comparable spectral strength.

EXAMPLE 4

3-Methoxy-4aminoazobenzene-3'-sodium sulfonate (165 parts) was diazotized with sodium nitrite in dilute hydrochloric acid in conventional fashion and the diazo compound was isolated by filtration and washed with water. The diazo wet cake was then added in portions to a solution of 58 parts of o-cresol and 21 parts of lithium hydroxide monohydrate in 600 parts of water at 25° C. The resulting aqueous mixture was treated with 2 parts of lithium hydroxide monohydrate and 83 parts of butylene oxide and then heated to the reflux temperature for 10 hours. Finally, 120 parts of NMP were added and total weight of solution was made up to 1200 parts with water. The amount of NMP in the solution was 10 weight % and the amount of dye was 17 weight % (based on an absorptivity for the pure dye of 58 liters/gram/cm. at 408 mμ), the dye being the lithium salt of the dye of the formula given above wherein $R^1$ is $CH_2CH(C_2H_5)OH$, X is H and Y is $CH_3$.

EXAMPLE 5

3-Methoxy-6-methyl-4-aminoazobenzene-3'-sulfonic acid (107 parts) was diazotized with sodium nitrite in dilute hydrochloric acid in conventional fashion and the diazo compound was isolated by filtration and washed with water. The diazo wet cake was slurried in 300 parts of water and then slowly added to a stirred mixture of 30 parts of phenol, 30 parts of lithium hydroxide monohydrate and 80 parts of NMP at 10°–20° C. The mixture was stirred for 1 hour at 20° C. and the pH was adjusted to 9 by the addition of lithium hydroxide monohydrate. The resulting mixture was treated with 79 parts of butylene oxide and then heated at 80°–100° C. for 6 hours. The total weight of solution was made up to 930 parts with water. The amount of NMP in the solution was 9 weight % and the amount of dye was 16 weight % (based on an absorptivity for the pure dye of 44 liters/gram-cm. at 395 mμ), the dye being the lithium salt of the dye of the formula given above wherein $R^1$ is $CH_2CH(C_2H_5)OH$, X is $CH_3$ and Y is H.

The embodiments of the invention in which an exclusive property or privilege is claimed are defined as follows:

1. Storage-stable, concentrated, aqueous, disazo acid dye solution consisting essentially of, on a weight basis,
  a. 10–25% of the lithium salt of the dye having the formula

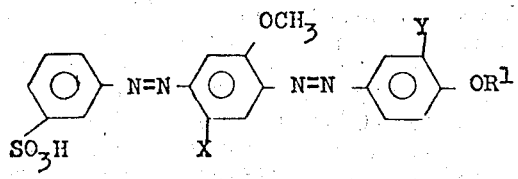

wherein one of X and Y is H and the other is $CH_3$ and $R^1$ is $CH_2CH_2OH$, $CH_2CH(CH_3)OH$, or $CH_2CH(C_2H_5)OH$;
  b. 5–25% of N-methyl-2-pyrrolidone; and
  c. the balance, to 100%, water.

2. The dye solution of claim 1 wherein component (a) is the lithium salt of the dye of the formula wherein $R^1$ is $CH_2CH(C_2H_5)OH$, X is H and Y is $CH_3$.

3. The dye solution of claim 1 wherein component (a) is the lithium salt of the dye of the formula wherein $R^1$ is $CH_2CH(CH_3)OH$, X is H and Y is $CH_3$.

4. The dye solution of claim 1 wherein component (a) is the lithium salt of the dye of the formula wherein $R^1$ is $CH_2CH_2OH$, X is H and Y is $CH_3$.

5. The dye solution of claim 1 wherein component (a) is the lithium salt of the dye of the formula wherein $R^1$ is $CH_2CH(C_2H_5)OH$, X is $CH_3$ and Y is H.

* * * * *